(12) United States Patent
Yilmaz et al.

(10) Patent No.: US 10,389,469 B2
(45) Date of Patent: Aug. 20, 2019

(54) SYSTEM AND METHOD TO ADD ALIEN WAVELENGTH CHANNELS TO OPTICAL LINE SYSTEM

(71) Applicant: Infinera Corporation, Sunnyvale, CA (US)

(72) Inventors: Omer Faruk Yilmaz, Sunnyvale, CA (US); Nikhil Kumar Satyarthi, Bangalore (IN); Parveen Kumar Gupta, Bangalore (IN); Jaijo Jose, Bangalore (IN); Saurabh Kumar, Sunnyvale, CA (US); Stephane St. Laurent, Roxboro (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/703,663

(22) Filed: Sep. 13, 2017

(65) Prior Publication Data

US 2018/0076919 A1    Mar. 15, 2018

Related U.S. Application Data

(60) Provisional application No. 62/393,907, filed on Sep. 13, 2016.

(51) Int. Cl.
| | |
|---|---|
| *H04J 14/02* | (2006.01) |
| *H04B 10/50* | (2013.01) |
| *G02B 6/26* | (2006.01) |
| *H04B 10/27* | (2013.01) |

(52) U.S. Cl.
CPC ........... *H04J 14/0205* (2013.01); *G02B 6/26* (2013.01); *H04B 10/27* (2013.01); *H04B 10/506* (2013.01); *H04J 14/0212* (2013.01); *H04J 14/0221* (2013.01)

(58) Field of Classification Search
CPC ... H04B 10/27; H04B 10/506; H04J 14/0205; H04J 14/0212
See application file for complete search history.

(56) References Cited

U.S. PATENT DOCUMENTS

| | | | |
|---|---|---|---|
| 2009/0092391 A1* | 4/2009 | Zong | H04B 10/07955 398/79 |
| 2012/0195592 A1* | 8/2012 | Barnard | H04J 14/0212 398/48 |
| 2017/0117983 A1* | 4/2017 | Al Sayeed | H04J 14/0221 |
| 2017/0353264 A1* | 12/2017 | Rao | H04J 14/0275 |

* cited by examiner

*Primary Examiner* — Dzung D Tran
(74) *Attorney, Agent, or Firm* — David L. Soltz; Dunlap Codding PC (57) ABSTRACT

Systems, methods, and devices for adding an alien or native wavelength optical signal to a fiber optic line. A portion of a spectrum of the fiber optic line corresponding to the optical signal is blocked with a wavelength selective switch (WSS). The portion of the spectrum is gradually unblocked until a power of the optical signal measured after the WSS is equal to a predetermined level. If the power and characteristics of the optical signal after the WSS satisfy one or more criteria, the portion of the spectrum is further unblocked until the power of the optical signal measured at the output is equal to an operational level.

17 Claims, 7 Drawing Sheets

SYSTEM AND METHOD TO ADD ALIEN WAVELENGTH CHANNELS TO OPTICAL LINE SYSTEM

CROSS REFERENCE TO RELATED APPLICATION

This application claims the benefit of U.S. Provisional Application No. 62/393,907, filed Sep. 13, 2016, the content of which is hereby incorporated by reference herein.

FIELD OF INVENTION

The disclosed embodiments are generally related to communications networking.

BACKGROUND

Fiber-optic communications transmit information from one place to another by sending a light stream through an optical fiber. This information-carrying light stream, which can be visible or invisible, and can be coherent or incoherent, and can be pulsed or can have a continuous amplitude, form an electromagnetic carrier wave which is modulated with the information. These modulated optical carrier waves can be referred to as optical carrier signals, or optical signals.

Multiplexing techniques, such as wavelength division multiplexing (WDM), can be used to transmit several different optical signals over a single optical fiber concurrently or simultaneously. Using WDM, each of the different optical signals has a different carrier wavelength, and one or more of the optical signals can be filtered from the other optical signals travelling through the optical fiber using a suitable optical filter mechanism. In some WDM applications, this optical filtering may not be required.

In multiplexed optical communications, it is sometimes desirable to add and/or drop an optical signal to an optical fiber through which one or more other optical signals are travelling. Typically, optical signals are added to an optical fiber using an optical multiplexing device. Such devices are referred to as optical add-drop multiplexers (OADM). OADM devices that include reconfigurable switches can also be referred to as reconfigurable optical add-drop multiplexers (ROADM). OADM devices which are not reconfigurable and where the add/drop functionality relies on fixed directivity and optical filtering can also be referred to as fixed optical add-drop multiplexers (FOADM).

An optical signal added to the optical fiber can, in some implementations, have parameters that are unknown to and/or inaccessible by the operator of the optical fiber and/or OADM. These parameters may include, for example, the wavelength of the optical signal, power of the optical signal, modulation format of the optical signal, or other parameters or characteristics. Such signals can be referred to as alien signals, alien wavelengths, or alien waves. In some implementations such signals can originate from a vendor different from the OADM vendor, or originate from equipment that is not under the control (or direct control) of the optical fiber and/or OADM. On the other hand, optical signals added to the optical fiber having parameters or characteristics, including those noted above, which are known and/or accessible by the operator of the optical fiber and/or OADM can be referred to as native signals, native wavelengths, or native waves. In some implementations, such native waves may originate from equipment that is under the control of the same vendor who controls the OADM equipment, for example.

An OADM can include one or more tributary input ports which are multiplexed and sent to a line output port (in the transmit/add direction). Tributary inputs can be single-wavelength (carrier/channel) sources, can be multi-carrier superchannels, or can be any combination of these (e.g., multiplexed before the OADM, where the multi-channel optical signal is then sent to a single tributary port of the OADM). The sources of these optical signals can be native to the line system (i.e., originate from or be under the control of the same OADM provider), can be alien wave sources, or can be a mix of both native and alien wave sources.

Because alien waves are not controlled by the operator of the optical fiber and/or OADM, insertion of, or changes in characteristics of, the alien wave during transmission can potentially disrupt the integrity of existing signals on the optical fiber (e.g., crosstalk, nonlinear impact, etc.), can result in failed operation, or can violate policies of the optical fiber network. Accordingly, it would be desirable to provide graceful turn-up, control, and/or maintenance for an alien wave. In some implementations, it may also be desirable to apply such graceful turn-up, control, and/or maintenance to native waves.

SUMMARY

Some implementations provide a method for adding or removing an optical signal to or from a fiber optic line. The method includes blocking input to the fiber optic line of at least a portion of a spectrum of the fiber optic line using a wavelength selective switch (WSS), the portion of the spectrum corresponding to the optical signal. The method also includes gradually unblocking the portion of the spectrum until a power of the optical signal measured after the WSS is equal to a predetermined level. The method also includes further unblocking the portion of the spectrum until the power of the optical signal measured at the output is equal to an operational level if at least one characteristic of the optical signal after the WSS satisfies a criterion.

In some implementations, the criterion comprises a power stability threshold or a permitted wave. In some implementations, the predetermined level comprises an intermediate power target (IPT). In some implementations, the predetermined level is low enough not to impact other optical signals on the fiber optic line. In some implementations, the predetermined level is high enough for the optical signal be reliably measured after the WSS. In some implementations, the predetermined level is based on a spectral width of the optical signal, or on a minimum power requirement of a fiber optic amplifier. In some implementations, the characteristic comprises the power of the optical signal.

Some implementations provide an optical multiplexer operable to add or remove an optical signal to or from a fiber optic line. The optical multiplexer includes a processor and a wavelength selective switch (WSS) operable to block input to the fiber optic line of a portion of a spectrum of the fiber optic line corresponding to the optical signal. The WSS is also operable to gradually unblock the portion of the spectrum until a power of the optical signal measured after the WSS is equal to a predetermined level. The WSS is also operable to further unblock the portion of the spectrum until the power of the optical signal measured after the WSS is equal to an operational level if at least one characteristic of the optical signal measured after the WSS satisfies a criterion.

In some implementations, the criterion comprises a power stability threshold or a permitted wave. In some implementations, the predetermined level comprises an intermediate power target (IPT). In some implementations, the predetermined level is low enough not to impact other optical signals on the fiber optic line. In some implementations, the predetermined level is high enough to be reliably measured after the WSS. In some implementations, the predetermined level is based on a spectral width of the optical signal. In some implementations, the predetermined level is based on a minimum power requirement of a fiber optic amplifier.

Some implementations provide an OADM operable to add or remove an optical signal to or from a fiber optic line. The OADM includes a processor and a wavelength selective switch (WSS). The WSS includes a WSS input port, a first WSS output port in communication with an optical power monitoring device (OPM) and a second WSS output port in communication with an output port of the OADM. The WSS is operable to send the optical signal from the WSS input port to the OPM via the first WSS output, and to block or unblock communication of the optical signal from the WSS input port to the OADM output port via the second WSS output port. The OPM is also operable to evaluate the optical signal to determine whether it meets a criterion, and to unblock and send the optical signal from the WSS input port to the OADM output port via the second WSS output port if the optical signal is determined to meet the criterion. In come implementations, sending the optical signal from the WSS input port to the OADM output port via the second WSS output port includes ramping up the optical signal. In some implementations, the optical signal is communicated to the WSS input port in a demultiplexer direction of the OADM.

DETAILED DESCRIPTION OF THE PREFERRED EMBODIMENT(S)

In order to add signals, such as alien wave or native wave signals to an optical line, and to control the alien or native wave signals on the line, controlled injection and power control of optical alien-wave or native wave signals into the optical line system can be provided at the OADM. Using controlled injection and power control, alien-wavelengths (e.g., from a third-party source or a subscriber domain) or native wavelengths (e.g., from the same vendor or subscriber domain) can be added to the optical line traffic (or maintained on the line) provided that they satisfy and continue to satisfy certain conditions.

An intermediate power level (IPL), which can also be referred to as an initial power level, can be chosen for the alien-wavelength or native-wavelngth signal which is low enough (e.g., below a threshold) to ensure that the alien-wavelength or native-wavelngth signal turn-up does not substantially impact or disrupt existing traffic (e.g., crosstalk), and which is high enough (e.g., above a threshold) such that reliable measurements of the alien or native signal can be taken (e.g., by an OPM). Turn-up includes the process of ramping up the power of a signal (in this case, the alien-wavelength or native wavelength signal). Turn-up can also include a calculation of a target value for the power of the signal after ramp-up. The alien or native signal is then measured and is added to the optical line or is blocked depending on whether the alien or native wave meets the desired conditions.

Figure 1:
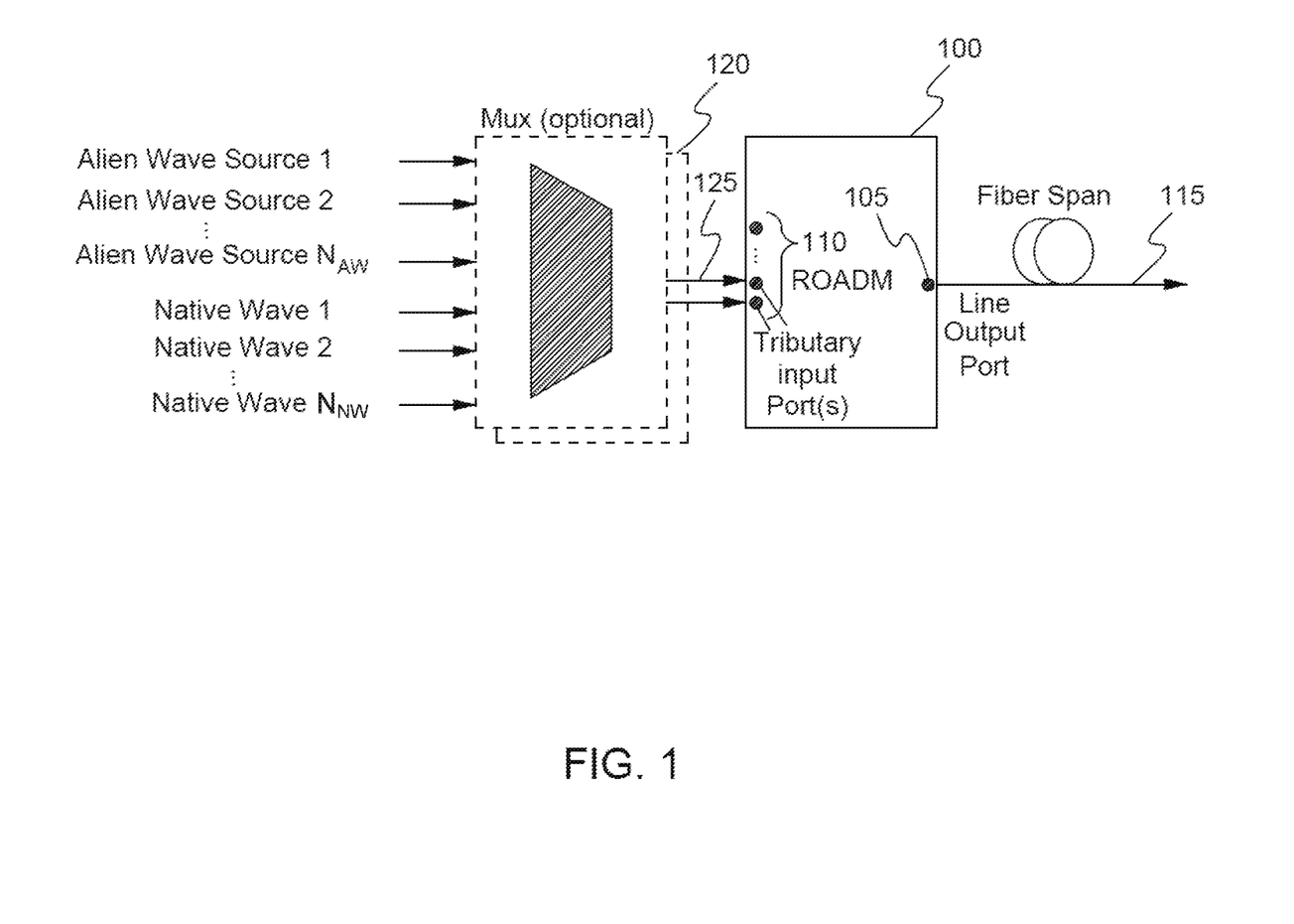
FIG. 1 is a block diagram illustrating an example OADM.

Various examples are described herein with respect to turn-up of an alien wave, however such techniques are also applicable to turn-up of native waves. Various examples are also described herein with respect to a ROADM, however it is noted that in other examples other types of OADM can be used. FIG. 1 is a block diagram illustrating an example ROADM 100. ROADM 100 can be a part of, or in communication with, an optical line system (not shown). ROADM 100 includes output port 105 and a plurality of input ports 110. Output port 105 can also be referred to as a line output port, and input ports 110 can also be referred to as tributary input ports.

Output port 105 is coupled to an optical fiber 115. Optical fiber 115 can be any suitable optical fiber capable of carrying several different optical signals concurrently or simultaneously, e.g., using WDM. Input ports 110 are coupled via one or more optical fibers to alien wave sources 1-$N_{AW}$ and native wave sources 1-$N_{NW}$. In this example, alien wave sources 1-$N_{AW}$ and native wave sources 1-$N_{NW}$ are multiplexed by an optical multiplexer 120, which is input to one of input ports 110 via a fiber 125. It is noted that in other implementations multiplexer 120 can be omitted, and alien wave sources 1-$N_{AW}$ and native wave sources 1-$N_{NW}$ can each be input to a different one of input ports 110.

A ROADM can include a wavelength selective switch (WSS), an optical power monitoring device (OPM), and one or more amplifiers, such as Erbium Doped Fiber Amplifiers (EDFA), in order to compensate for losses in signal power. Using the OPM, a spectral distribution of the optical power of one or more (or all) of the optical signals input to the ROADM (or of the signal after accumulated power losses in the ROADM) can be acquired. The acquired spectral power information can be processed to compute optical attributes for optical power control (e.g., power of a carrier or a super-channel, its spectral shape, etc.). Losses in signal power, e.g., due to the WSS and/or any power splitter used to tap power from the OPM (and/or any other active or passive optical component), can be significant and may need to be compensated. As an example only, 10% the power of a signal input to the ROADM may be diverted to the OPM in order to measure the spectral distribution of the optical power of the signal.

Various hardware arrangements are possible to compensate for these internal power losses. One example approach for compensating the internal power losses is to implement an EDFA after the WSS and before the OPM in the optical path. The order of these devices in the optical path can be based on tradeoffs involving optical signal quality, accumulated power losses, and the placement and specifications of the components. These choices can impact the hardware (HW) design and HW specifications, (e.g., the OPM may need to be specified such that the minimum optical signal power that the OPM can reliably measure is suitable for the power of the optical signal that will be input to the OPM).

Implementing the OPM after the EDFA in the optical path can have the advantage of improving signal quality; e.g., signal-to-noise ratio (SNR). For example, implementing the OPM before the EDFA, by reducing the power input to the EDFA, could increase relative noise level introduced by the EDFA. By implementing the OPM after the EDFA, the signal input to the EDFA is not decreased by the OPM, which can result in less relative noise level being introduced by the EDFA. Implementing the OPM after the EDFA in the optical path requires the EDFA to be turned on in order to measure optical power at the OPM however. In other implementations, the OPM can be placed before the EDFA in the optical path. In either case, the signal input to the OPM may need to have a certain minimum power level in order for the OPM to provide reliable power readings. The minimum optical power of the input signal required for the OPM to reliably measure the optical signal power is referred to herein as the OPM reliability threshold. The power of the signal input to the OPM should exceed the OPM reliability threshold sufficiently for the OPM to provide a reliable measurement of the power of the signal.

In general, procedures for adding and removing alien or native sources to and from an optical line can be pre-determined. It may be assumed however that the addition and removal of the alien or native sources will take place unexpectedly. One example of such a scenario is a provider-subscriber scenario where traffic demand patterns change, the network changes dynamically, and/or services are added and/or removed while live traffic already exists on the optical line system. It also may be assumed that alien or native wave source power cannot be controlled directly by the operator of the OADM and/or optical fiber, and thus closed-loop control of the alien or native wave source power is not possible. Nevertheless, it would still be desirable to achieve a graceful turn-up of the alien or native wave optical signal.

An example procedure for hardware turn-up of the OADM tributary input or inputs begins with the WSS (and therefore the tributary input) in a blocking state by default. In this example, an alien or native wave is applied to the tributary input, and the WSS initially blocks the alien or native wave entirely. If alien or native wave services are provisioned in the OADM by the network operator, a portion of the available spectrum (e.g., the remaining spectrum available on the fiber line, or a suitable subset of the remaining spectrum available on the fiber line) is allocated to the alien-wave or native-wave(s) by the OADM. Services, in this context, can include a definition of traffic flow from an input tributary port of the OADM (e.g., tributary input port 110) to a line port of the OADM (e.g., line output port 105) where the user (e.g., the network operator) can specify which portion of spectrum from which tributary port flows to the line port. Provisioning (i.e., service provisioning), in this context, can include the network operator issuing a command to the OADM. The provisioning of alien or native wave services in the OADM and the actual physical connectivity of the alien-wave source to the OADM can take place at different times. Accordingly, the tributary input (i.e., the WSS in this example) remains in a blocking state until the involved parties (e.g., the network service provider and subscriber) are ready (e.g., where the alien wave source is physically or operatively connected to the input tributary port of the OADM with a suitable power level) for turn-up of the alien or native wave.

In this example, the WSS is used as a shutter which filters out a specific set of wavelengths. The WSS itself can be considered a shutter, and/or the blocking capability of the WSS can also be associated with an abstract shutter, e.g., in software and/or hardware control. The shutter and the specific set of wavelengths filtered by the WSS is directly controllable by the OADM, either based on user input or automatically based on a set of rules. This can have the advantage of providing a safety mechanism where the addition of new channels (e.g., alien or native waves) can be administered in a controlled fashion (e.g., the alien or native waves are only admitted if the shutter on specified wavelengths is set to an 'unblock' setting, otherwise, the alien or native waves are blocked in a controllable fashion).

The demultiplexing direction of an OADM (e.g., in the reverse of the arrows shown with respect to OADM 100 in FIG. 1) can also act as a shutter if the OADM is equipped with a suitable device, such as a WSS in the demultiplexer direction. An independent control for the demultiplexer direction of the OADM can be implemented if desired where the alien or native traffic is blocked when the shutter is closed by the operator and allowed to be dropped when the shutter is opened by the operator.

Figure 2:
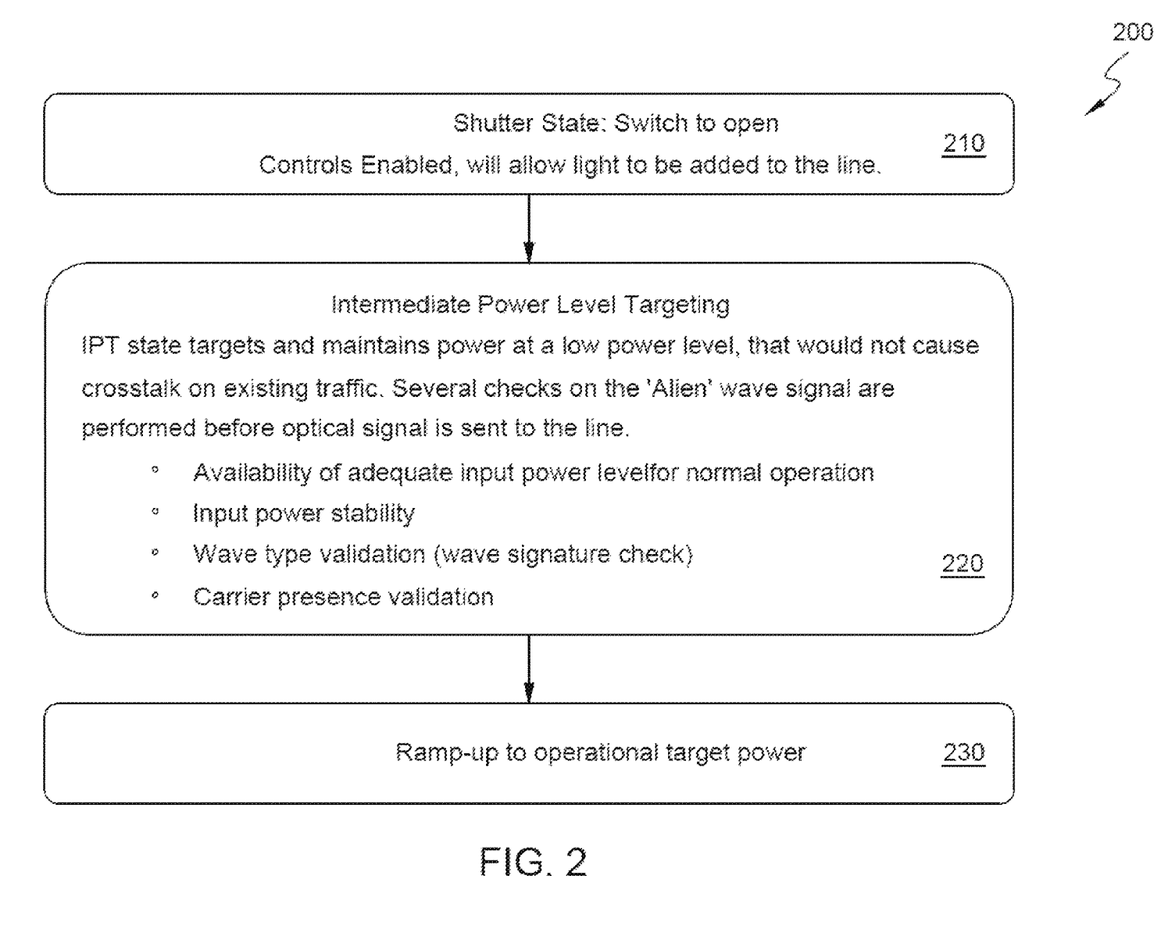
FIG. 2 is a flow chart describing an example alien wave turn-up method.

FIG. 2 is a flow chart describing an example alien wave turn-up method 200, which further illustrates these concepts at a high level. FIG. 2 and other examples henceforth are described with respect to turn-up of an example alien wave only, however it is noted the concept is also or alternatively applicable to turn-up of a native wave. Method 200 can be implemented, for example, using ROADM 100 as shown and described with respect to FIG. 1.

In step 210, the "SHUTTER" state is set to "OPEN" and the ROADM unblocks (i.e., opens) a passband in the WSS which corresponds to the alien wavelength. In this example the WSS opens this passband with maximum attenuation. After the passband is opened, the ROADM begins an Intermediate Power Targeting procedure (IPT) 220. In the IPT procedure, the target power at the line output is set to a pre-determined intermediate power level—the IPL—which can be determined based on source wave properties. The IPL is sufficiently high such that the OPM can reliably measure the power level of the alien wavelength signal to perform several verifications. For example, the OPM (or another device) can determine the availability of adequate input power for normal operation, such as stability of the input power, or validity of the input wave (e.g., whether the wave type is authorized to be added to the optical line traffic), or the OPM can validate carrier presence (e.g., by detecting a power profile of the alien wavelength signal, by detecting the alien wavelength signal to verify how many carriers are present, or by concluding that no carriers are present if the power is too low) or the alien wavelength signal's spectral footprint. The IPL is also sufficiently low that the alien-wave will not cause a significant impact on the existing traffic, and that the alien wave will not be able to close the link (e.g., the power of the alien wavelength signal will not be sufficient to reach the drop destination; i.e., the location where the alien traffic is removed from the optical line system) before it is approved to be added to the link. The ROADM can calculate the alien-wave power at the tributary input port by tracing it back to the tributary port through the optical components using the calibrated insertion losses, and attenuations/gains in the order they are physically present in the optical path. This provides the input power at the ROADM tributary port, which is referred to herein as PAlienSCH_ROADM_Trib-Input_Calculated.

For Intermediate Power Targeting (IPT), a target power at the ROADM Line Output, referred to herein as $P_{AlienSCH\_IPT\_LineOut}$, is calculated (e.g., in the ROADM). The target power level is determined based on a set of predetermined rules, such as the spectral width of the alien-wave and the minimum power requirements of the EDFA in the ROADM, such that it is guaranteed to meet the EDFA minimum power requirements.

$$P_{AlienSCH\_IPT\_LineOut} = P_{AlienSCH\_NominalLaunchTargetAtLineOut} - \text{Offset}_{IPT\_Ptarget}$$

where, $P_{AlienSCH\_NominalLaunchTargetAtLineOut}$: is the nominal channel (CH) launch power into the fiber span. It can be a function of spectral bandwidth of the alien-wave CH, and the desired launch power offset for the particular CH (it is noted however that an alien wave can comprise a multi-wavelength source; and $\text{Offset}_{IPT\_Ptarget}$: is the offset parameter to determine the target power level during IPT. It is a function of predetermined parameters. In some implementations, $\text{Offset}_{IPT\_Ptarget}$ can have a value of a few to tens of dBs. It is noted that that the CH can include a single or multiple optical carrier which can also be referred to as a super-channel (SCH).

The ROADM (e.g., using a software or hardware control loop) attempts to achieve the IPT level power for the SCH of interest. In order to do so, the ROADM can measure the SCH power at the line output using the OPM and adjust the WSS Attenuation accordingly. It is noted that a lower limit of the WSS passband attenuation can be set (e.g., in software in the ROADM). This may be used to lower the risk of traffic hits (e.g., crosstalk interference) due to power overshoot if the alien wave input power to the ROADM is low initially, and suddenly increased to desired power levels. Accordingly, a minimum limit for the WSS attenuation back-off can be introduced such that the WSS attenuation is not indefinitely backed off to meet the intermediate power level targeting. If WSS attenuation were allowed to back off indefinitely, power at the line output could increase beyond an acceptable level to cause interference. The minimum attenuation limit for the WSS passband, referred to herein as $\text{Att}_{WSS\_IPT\_Min}$, can be calculated as follows:

$$\text{Att}_{WSS\_IPT\_Min} = \text{Att}_{WSS\_NominalLaunchTargetAtLineOut} - \text{Offset}_{IPT\_MinAtt}$$

Where, $\text{Att}_{WSS\_NominalLaunchTargetAtLineOut}$: is the expected WSS Attenuation when the alienwave meets or exceeds the minimum power requirements at the ROADM tributary input; and $\text{Offset}_{IPT\_MinAtt}$: is the amount of backoff allowed in case minimum power condition is not allowed, but still the IPT level for targeting can be achieved.

If the intermediate target power level is achieved, the ROADM (e.g., a software routine executing on a processor of the ROADM) can check one or more qualities of the alien-wavelength signal or signals in order to reduce the potential for any impact to the existing traffic and/or to determine whether the source should be permitted to be added to the link due to licensing or other reasons. It is noted that the qualities of the alien wavelength signal can be measured before or after amplification, e.g., based on whether the OPM is implemented before or after the EDFA in the signal chain. These quality checks can include, but are not limited to, checking the (i) amount of the power input to the ROADM, (ii) the existence of specified optical channel(s) at the provisioned spectral positions (e.g., cross-checking against provisioning information), (iii) power stability of the to-be-added carrier/super-channel, (iv) spectral shape or features of the carrier or the super-channel based on the OPM scan, and so forth. An optical carrier or a super-channel may be allowed on the link (line signal) only if the signal(s) satisfy a desired set of conditions, such as those described in the example above. The ROADM may periodically audit the optical signal while keeping the signal at the IPL (or as close as possible to the IPL), until the conditions are met, or it may determine to block the passband (e.g., based on one or more predetermined conditions). The ROADM may generate controller alarms (e.g., using software and/or hardware) if certain conditions or conflicts are detected.

If the necessary conditions are met, The ROADM may permit ramp-up of the optical power to the normal target levels at the line output to proceed. During normal operation, the ROADM may perform periodic or occasional audits to verify the same conditions checked during the IPT, similar conditions, or other conditions.

Example verifications which can be performed during IPT can include input power level, input signal spectral allocation, input power stability, input signal spectral features, and similar verifications.

For input power level verification, calculated input power at the tributary input can be compared against the target power to determine whether the calculated input power is too low for the normal target (i.e., final and/or optimal launch power at the line output so that an end-to-end link can be closed) at the line output to be achieved or too high, such that it may disrupt the traffic existing on the line.

Figure 3A:
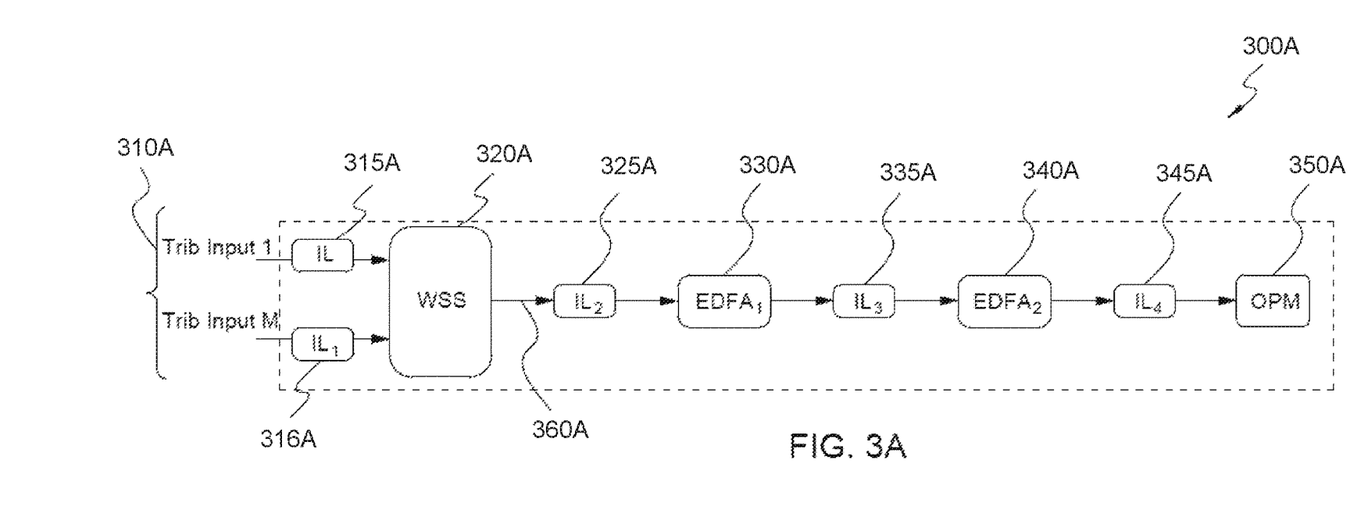
FIGS. 3A and 3B are block diagrams illustrating example optical paths from one or more tributary inputs in an OADM.

The input power can be calculated by tracing the OPM readings back to the ROADM input port through the passive or active optical components through which the signal passes, e.g., using calibration and set and/or measured control data. A sample block diagram for the optical path of interest is shown in FIG. 3. FIG. 3A illustrates an example of a typical optical path 300A from one or more tributary inputs 310A to an OPM 350A in a ROADM (such as ROADM 100 as shown and described with respect to FIG. 1). Optical path 300A proceeds from tributary inputs 310A to WSS 320A, encountering internal losses 315A, 316A. Optical path 300A proceeds from WSS 320A to OPM 350A via output port 360A and EDFAs 330A and 340A, encountering internal losses 325A, 335A, and 345A. Internal losses may be due to optical taps, splices, etc. It is noted that other arrangements of the optical path are possible.

Figure 3B:
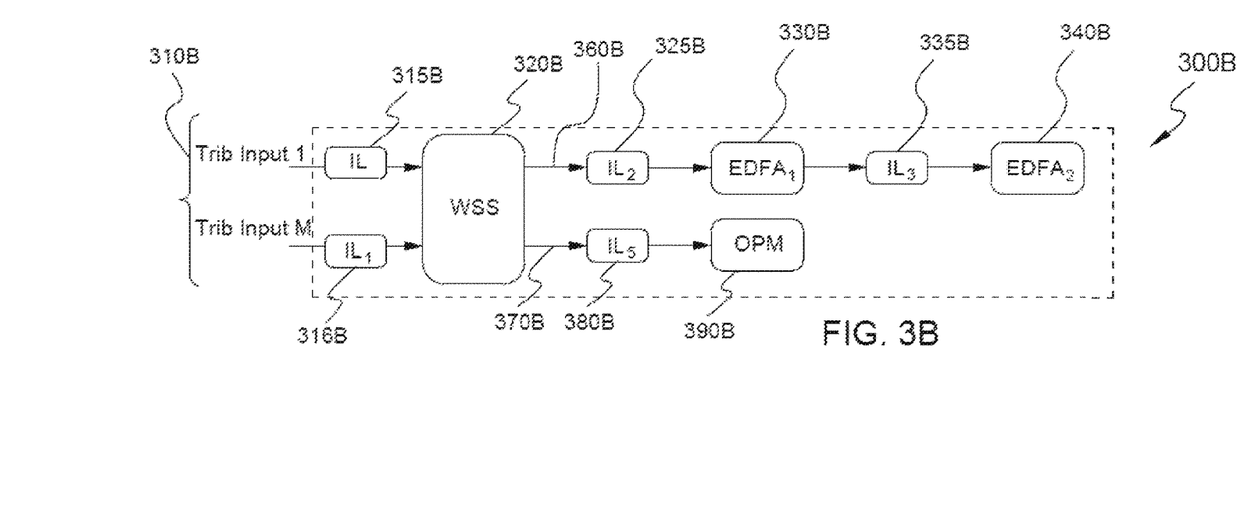

FIG. 3B illustrates another example of a typical optical path 300B from one or more tributary inputs 310B to an EDFA 340B in a ROADM (such as ROADM 100 as shown and described with respect to FIG. 1). Optical path 300B is similar in some respects to optical path 300A except in that WSS 320B includes two output ports. Optical path 300B proceeds from tributary inputs 310B to WSS 320B, encountering internal losses 315B, 316B. Optical path 300B proceeds from WSS 320B to a line output EDFA 340B of the ROADM via output port 360B and EDFA 330B, encountering internal losses 325B and 335B. Internal losses may be due to optical taps, splices, etc. Optical path 300B also proceeds from WSS 320B to an OPM 390B via output port 370B, encountering internal loss 380B. It is noted that other arrangements of the optical path are possible.

In the example of FIG. 3B, the WSS 320B can be configured to communicate a wave of interest to be turned-up from one of the tributary inputs 310B to output port 370B (i.e., the output port of WSS 320B that is connected to an OPM-OPM 390B in this case) for evaluation to determine whether it satisfies the criterion or criteria required for turn-up (e.g., using various criteria described herein). WSS 320B can be configured to ramp-up the wave of interest from the corresponding tributary input 310B to output port 360B (i.e., the output port of WSS 320B that is connected to a line output of the ROADM (line output EDFA 340B in this case) if the wave is found to satisfy the desired criteria for turn-up, and to block communication of the wave of interest from the corresponding tributary input 310B to output 360B if the wave is found not to satisfy the desired criteria.

The input power level can be described using a generalized equation:

$$P_{ROADM\_TribInput\_Calculated}[n] = P_{OPM}[n] - \sum_{i}^{mG} G_i[n] + \sum_{j}^{mL} L_j[n] + Att_{WSS}[n]$$

Where,

[n] is the spectral slice index. In the equation, all parameters are a function of slice index, which is used to describe spectral distribution (wavelength dependency) of each parameter. The spectral slice width in many commonly used OPMs is 12.5 GHz. The 12.5 GHz granularity can be chosen to be in line with WSS technology. These granularities can be independent however, and OPM granularity can be mapped to WSS granularity if they are different. For example, if OPM granularity is 6.25 GHz, while WSS granularity is 12.5 GHz, the power of two 6.25 GHz OPM slices can be combined to obtain the power of one 12.5 GHz WSS slice. The bounds mG and mL correspond to the number of gain elements for G and the number of loss elements for L. It is noted that in various implementations this calculation can be carried in terms of average powers and losses instead of or in addition to carrying it out on a per-slice basis, e.g., depending on the level of desired accuracy and complexity of computation.

$P_{ROADM\_TribInput\_Calculated}$: is the calculated power per spectral slice at the ROADM's tributary input port.

$P_{OPM}$: is the measured power per slice at the OPM.

$G_i$: is the gain of optical components that provide gain (such as EDFAs), this can be measured and stored in the ROADM during manufacturing.

$L_j$: is the loss of each optical component that induces a loss in the signal (such as, optical taps, splices, etc.) in the path from OPM to Tributary Input Port. This can be measured and stored in the ROADM, e.g., during manufacturing. In other implementations, an active device, such as a Variable Optical Attenuator (VOA) can be used such that its loss at a particular setting can be measured and calibrated out to be made available for calculations.

$Att_{WSS}$: is the attenuation set point for each spectral slice on the WSS. This is updated based on the latest set point.

Figure 4:
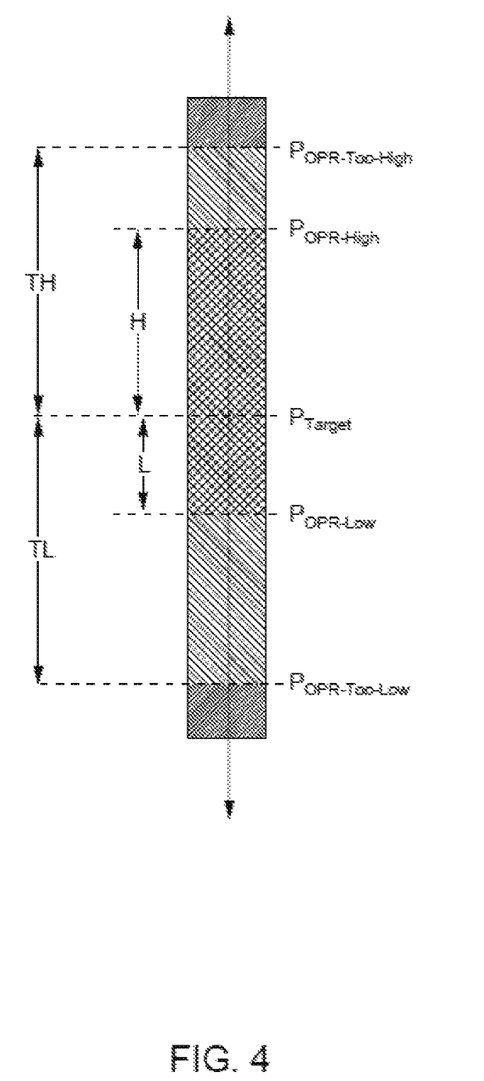
FIG. 4 is a bar graph illustrating example alarm thresholds with respect to target power.

These parameters can be expressed in units of dBm/dB, for example, or the parameters can be converted to linear units to carry similar calculations in the linear domain Alarms can be generated based on the input power level. For example, a user may be notified and/or control actions can be taken based on various alarm thresholds. FIG. 4 illustrates several example alarm thresholds with respect to the input target power $P_{Target}$, including $P_{OPR-High}$, $P_{OPR-Too-High}$, $P_{OPR-Low}$, $P_{OPR-Too-Low}$. Here, OPR indicates optical power received. The thresholds can be customizable based on pre-determined source properties and node configurations, for example. In an example implementation, the range between $P_{Target}$ and $P_{OPR-Low}$ can be considered to be allowable, where no alarm is raised. The range between $P_{OPR-Low}$ and $P_{OPR-Too-Low}$ can also be considered to be allowable, but an OPR_LOW alarm can be raised in this range. The range below $P_{OPR-Too-Low}$ can be considered not to be allowable, and a OPR_TOO_LOW alarm can be raised. Similar alarms can be provided for the $P_{OPR-High}$ and $P_{OPR-Too-High}$ thresholds. Options can be provided for the user to allow or disallow alien-wave turn-up and/or terminate the services for the wave based on determined properties. An example set of such options may include, for example: for alien type 1, allow turnup of the service even during an OPR_TOO_LOW/HIGH alarm; and for alien type 2, never allow turnup of the service during an OPR_TOO_HIGH/LOW alarm.

For input signal spectral allocation verification, the ROADM can verify whether there is an optical signal at the provisioned wavelengths of the alien-wave. If the alien-wave or portion or the alien-wave (e.g., a subset of the carriers of an alien SCH) is found to be missing, an alarm can be generated, and the turn-up process can be frozen or aborted. For input power stability verification, the OPM can perform periodic or occasional scans during the turn-up process. Variation in the measured power of the alien-wave can be compared against an acceptable threshold for variation. If instability is detected, the turn-up process can be aborted, or can be frozen until stability is achieved. For input signal spectral features verification, an OPM scan can be taken to trace spectral features of the input source. Some implementations may provide for increased OPM scan resolution, which may facilitate a more detailed feature scan. Measured spectral features, such as shape, bandwidth, center, and etc. can be compared against the provisioned channel information.

Figure 5:
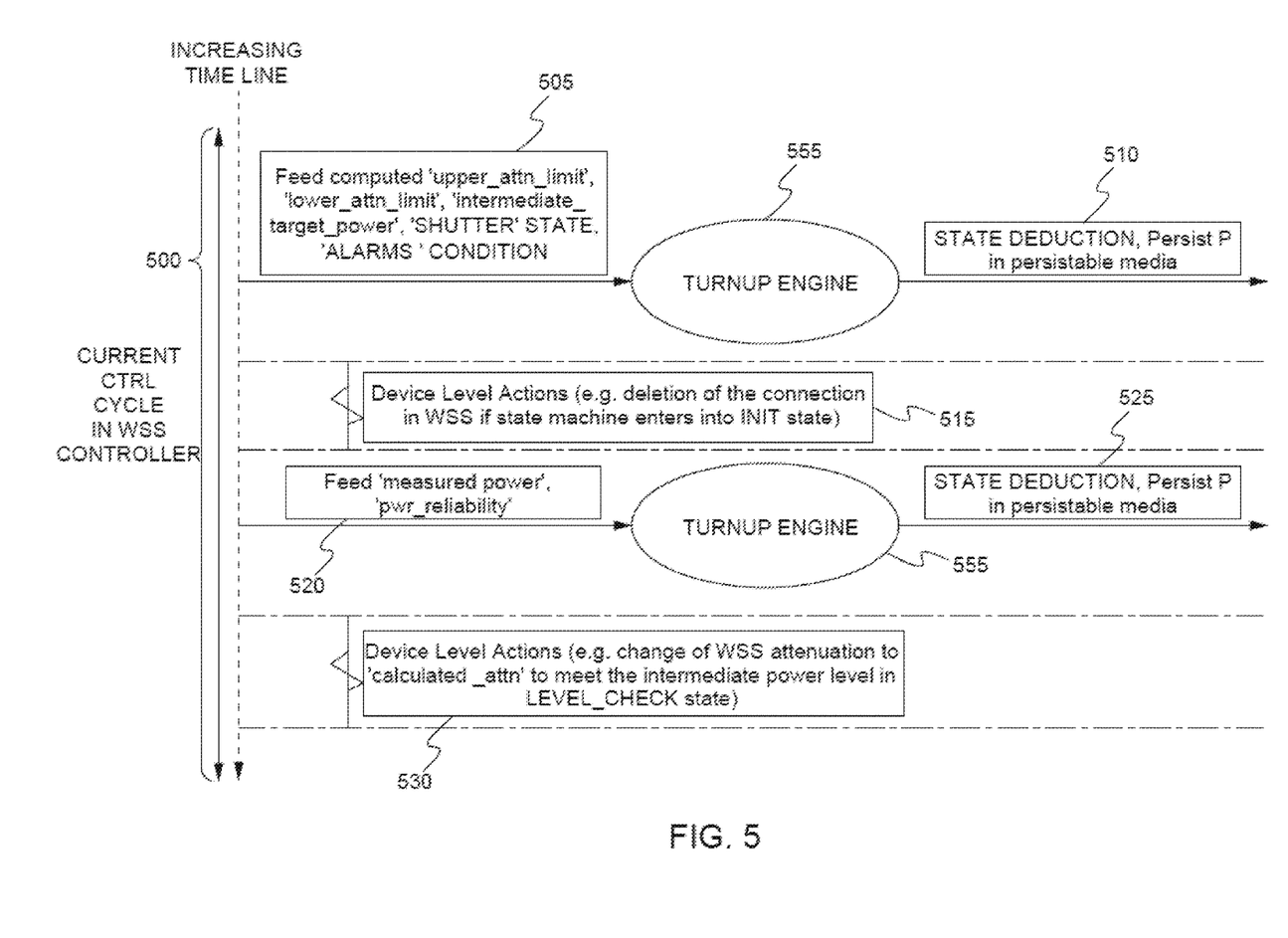
FIG. 5 is a flow chart which illustrates an example high level flow of a wavelength selective switch controller in the context of intermediate power targeting.
Figure 6:
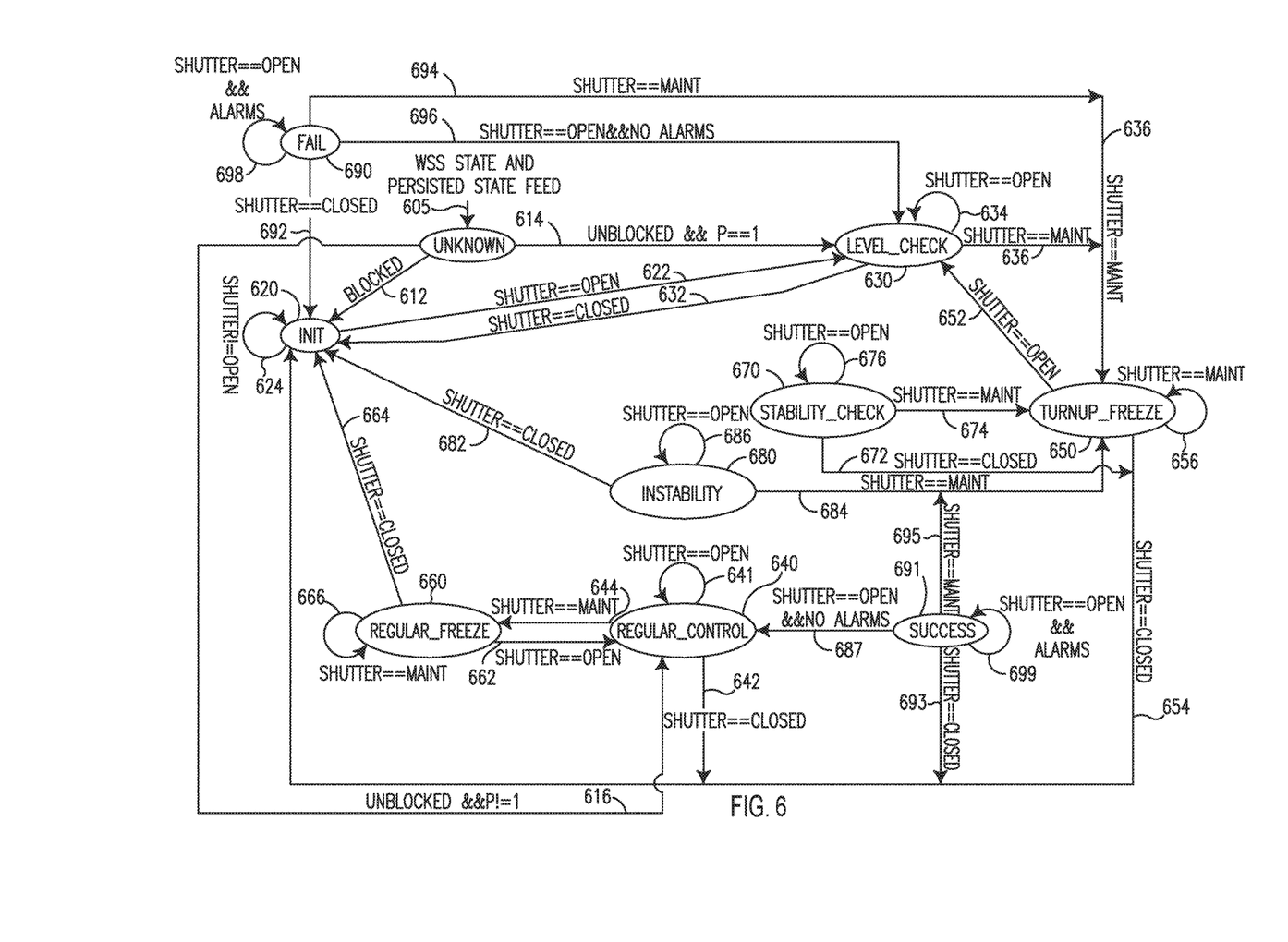
FIG. 6 is a state transition diagram illustrating example state transitions of the turn-up engine.
Figure 7:
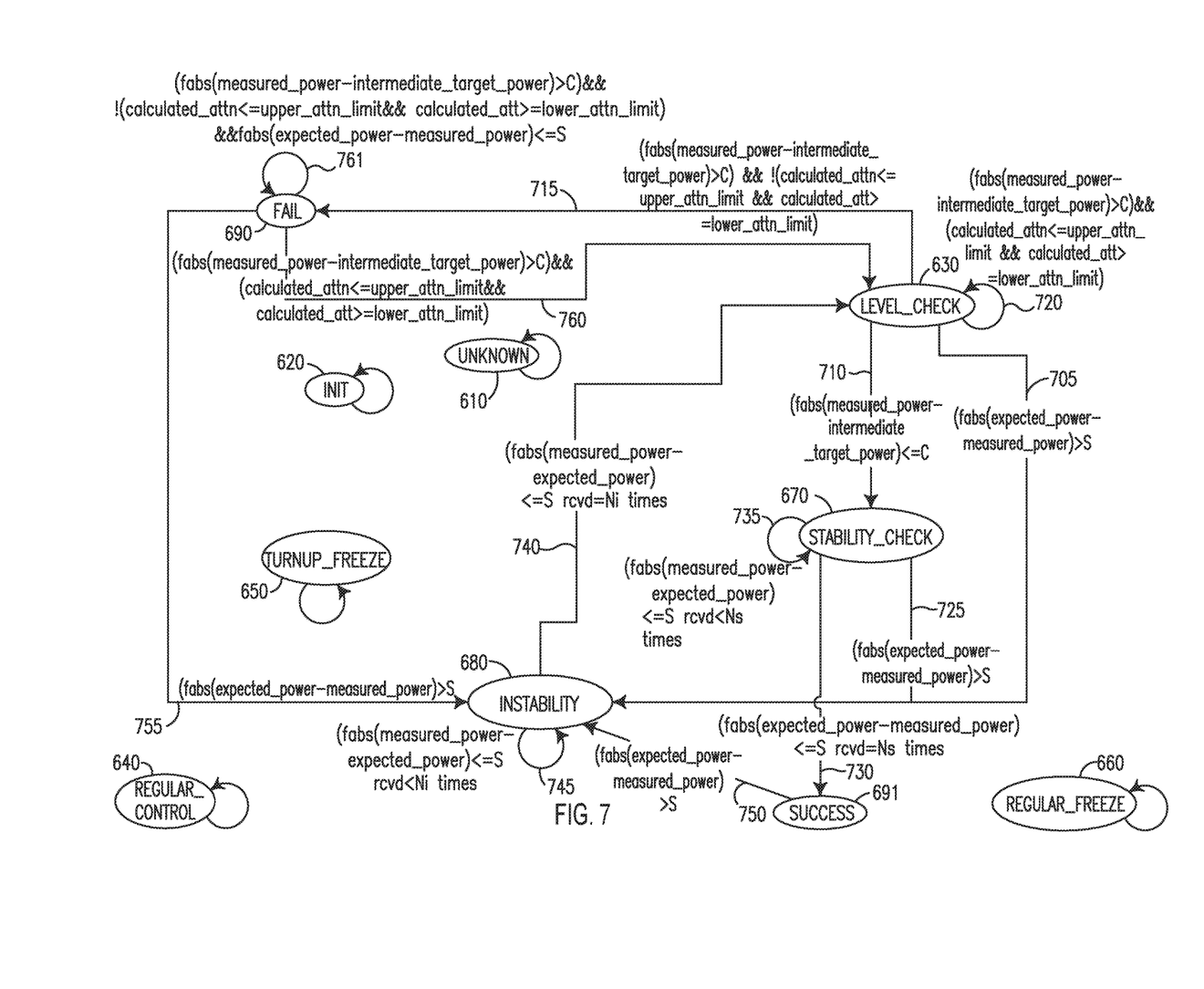
FIG. 7 is state transition diagram illustrating further example state transitions of the turn-up engine.

FIGS. 5, 6 and 7 describe an example implementation of IPT logic using a turn-up engine 555 (e.g., a finite state machine) which can be run in the context of a WSS controller (e.g., a control loop implementation which controls the WSS device attenuation levels against power level changes using periodic OPM reads). The turn-up engine 555 can be implemented, for example, as finite state machine software executing on a processor of the WSS controller, on an application specific integrated circuit (ASIC) or field programmable gate array (FPGA) on or in communication with the WSS controller, or any other suitable device.

The WSS controller can periodically (or occasionally) read the OPM device to compute the measured power of the super-channel, can compute various parameters, and can provide this information to the turn-up engine 555. The turn-up engine 555 can execute its state machine algorithm, can transition to a state based on the parameter values, and can command the WSS controller to take actions based on the state (e.g., delete WSS connection, set IPT attenuation, or run regular device controls to compensate against power level changes and ramp the super-channel to meet the regular target power. Here, a regular device control, (also referred to as regular control) is a mechanism for reading the OPM, setting the attenuation, and repeating this process on a continuing basis so as to launch an optimal target power on the line out. Regular controls can be used to launch a target power optimized to close the link between source and destination. Regular controls can be executed in a continuous fashion to compensate variable losses and/or aging in the system. Variable losses and/or aging in the system can be due, for example, to fiber bends or changes in EDFA gain values over time.

FIG. 5 is a flow chart which illustrates an example high level flow of the WSS controller in the context of IPT. More detailed operation is discussed with respect to FIGS. 6 and 7. FIG. 5 shows a control loop cycle 500 of the WSS controller where each loop cycle includes OPM device measurements, control parameter computation, input of the measured and computed parameters to the turn-up engine, performing actions as commanded by the turn-up engine, performing device controls (e.g., adjusting the WSS device attenuation or variable optical attenuator (VOA) control) as part of regular power controls for loss compensation (e.g., losses due to fiber bends or amplifier/device aging over a period of time which cause power changes), ramp-up of the super-channel to meet the regular target power, and then moving on to the next control loop cycle.

In this example, various parameters 505 are computed by the WSS controller. The inputs to this calculation can include, for example, spectral width of the alien wave SCH, insertion loss in the system, amplifier gain, or user controller power offsets. Computed parameters 505 include 'upper_attn_limit' (i.e., upper WSS attenuation limit), 'lower_attn_limit' (i.e., lower WSS attenuation limit), 'intermediate_target_power' (i.e., the target power level calculated via IPT), 'SHUTTER' state (based on operator's configuration; e.g., OPEN, CLOSED, MAINT. The operator or user can choose to put the shutter in the MAINT maintenance state. In the MAINT (i.e., maintenance) state, controls, including the IPT, can be frozen.), and 'ALARMS' condition (e.g., a tri-stated value based on difference between the last cycle's measured power and the intermediate target power at the tributary input port. In this example, the three states are ALARMS, NO ALARM, IGNORE ALARMS). The computed parameters are fed to the turn-up engine 555 from the WSS controller, and the turn-up engine 555 can transition to one of the states based on state deduction 510, e.g., by the state machine logic, and can command the WSS controller to take actions 515.

If, for example, the turn-up engine 555 transitions to the 'INIT' state, the WSS controller deletes the WSS connection for the super-channel if it is UNBLOCKED in the WSS, otherwise nothing is done by the WSS controller in this state. If the turn-up engine 555 has not entered to 'INIT' state, 'measured_power' and boolean 'pwr_reliability' parameters 520 are input to the turn-up engine 555 from the WSS controller. Here, measured_power is the power of the alien-wave super channel measured by the OPM, and pwr_reliability is an indication of whether measured_power is greater than or less than the OPM reliability threshold. The turn-up engine 555 can transition to one of the states based on state deduction 525, e.g., by the state machine logic, and can command the WSS controller to take actions 530. If the turn-up-engine 555 transitions to the 'LEVEL_CHECK' state based on these parameters, and if some attenuation setting is commanded to the WSS controller for intermediate power targeting, the WSS controller applies the attenuation setting as computed and commanded by the turn-up engine 555. If the turn-up engine 555 transitions to the 'REGULAR_CONTROL' state, the intermediate power targeting phase ends and the WSS performs regular power controls to compensate against losses or ramp up of the super-channel to meet the regular target power, etc.

It is noted that as part of each state transition, the turn-up engine 555 also stores a consolidated state ("P" in FIG. 5) in a storage device (e.g., a FPGA or any suitable memory device). The state is referred to as consolidated in this instance because it can take a given value corresponding to more than one state of the state machine. This consolidated state can be stored as a Boolean variable. For example, the consolidated state may be stored in a Boolean variable 'P' where a value of 1 indicates that the turn-up engine 555 is in an IPT phase, and a value of 0 indicates that the turn-up engine 555 is not in an IPT phase. This variable can be used to restore the turn-up engine 555 to the turn-up state rather than the regular controls state if the ROADM reboots during turn-up P is equal to 1. This can be helpful if a reboot happens during the regular controls phase (e.g., corresponding to P=0), because post reboot intermediate targeting should not be done in this case due to possible effects on the link traffic. For example the turn-up engine 555 may command the WSS controller to adjust the WSS attenuation to meet the intermediate target power and intermediate target power is generally lower than the regular target power.

The IPT phase includes the following states of the example turn-up engine 555 state machine, and correspond to P=1: LEVEL_CHECK, STABILITY_CHECK, FAIL, INSTABILITY_DETECTED, SUCCESS, TURNUP_FREEZE. The following states of the example turn-up engine 555 state machine are outside the intermediate targeting phase and correspond to P=0: INIT, REGULAR_FREEZE, REGULAR_CONTROL. A general, high-level description of each of these turn-up engine 555 states are as follows:

UNKNOWN: is the default state to which the turn-up engine 555 is initialized. Inputting the WSS state and the stored state variable to the engine 555 can cause the turn-up engine 555 to transition to one of the 'known' states below.

INIT: corresponds to a state where the connection is absent in the WSS device (corresponding to the BLOCKED condition or SHUTTER=CLOSED condition). In other words, the WSS is fully attenuated for the alien wave. Any condition (e.g., due to shutter state or a power failure condition) leading to deletion, disconnection, blocking, or otherwise ending of the WSS connection will result in a transition of the turn-up engine 555 to this state. The shutter state can be explicitly fed to the state machine, whereas a power failure condition will implicitly 'reset' the state machine to the 'INIT' state. Such logic to 'reset' the turn-up engine 555 on power failure conditions can be handled by the WSS controller, as the power failure condition logic is outside the scope of the turn-up engine 555 and the WSS controller can delete the WSS connection upon a power failure condition on its own. While a power failure condition exists, the WSS controller does not feed any parameters to the turn-up engine 555. After a power failure condition is resolved, the various parameters can once again be input to the turn-up engine 555. Based upon the input parameters, the turn-up engine 555 can again enter the IPT phase. This can be advantageous because in order to bring up the super-channel after the power failure is over, the input power conditions of the super-channel are advantageously checked to determine if they are in operable range post the power failure clearance. After the IPT phase, the turn-up engine 555 enters a regular controls phase, and the super-channel is ramped. Ramping in this context refers to gradually increasing power to reach the target power of the super-channel. Power failure conditions may occur due to a patch cable being cut, leading to loss of signal (LOS) condition at the input of the ROADM, for example, or due to user triggered locking of the ROADM card both of which can lead to deletion of the WSS connection. A user can lock a ROADM card, e.g., to stop any optical signal from being launched out of the card. If a user locks the card, the WSS connection can be deleted such that no light can pass through the WSS to the line port.

LEVEL CHECK: corresponds to the state where the shutter is opened (corresponding to the SHUTTER=OPEN condition) and IPT is in progress. In this state, the input parameters from the WSS controller are evaluated (e.g., by software executing on a processor of the ROADM, an ASIC, FPGA, or any other suitable device or combination of software and hardware) and the WSS attenuation is adjusted to meet the intermediate power target during every control cycle (e.g., control loop cycle of the WSS controller).

STABILITY CHECK: If the intermediate target power is met (e.g., current measured power within a range C of intermediate target power. In this example, C=0.2 is the tolerance or grace limit. If, for example, current power were to be off the intermediate target power by 0.17 dBm, the intermediate target level may be considered to have been achieved in this example because 0.17 dBm is less than the 0.2 dBm example tolerance, It is noted that any suitable value of C can be used.) in the LEVEL CHECK state, the input power stability is checked by entering into this state (e.g., current measured power determined to vary within a tolerable range S, (such as, for example, variance<S=0.5 dBm). Input power stability checks are further described with respect to FIG. 7). This check may be performed for a number of control cycles Ns (e.g., control loop cycles of the WSS controller; as depicted, for example, Ns=3, in FIG. 7). If the power level is determined to be stable and no alarms condition is present, then the turn-up engine 555 transitions to the REGULAR CONTROL state, where regular ramp-up of the super-channel and closed loop controls are performed.

INSTABILITY: If the input power fluctuates by more than a tolerable limit S (e.g., fluctuation>S=0.5 dBm) in the LEVEL CHECK state, STABILITY CHECK state, SUCCESS state or FAIL state, the input power is determined to be unstable and the turn-up engine 555 enters to the INSTABILITY state. In this state, the input power is again checked for stability for a few control cycles Ni (in the example depicted, Ni=2, in FIG. 7). If the power remains unstable and continues to fluctuate by more than the tolerance limit of S, the turn-up engine 555 remains in the same state. If the power stabilizes and remains within the tolerance limit of S for Ni control cycles, the turn-up engine 555 transitions to the LEVEL CHECK state. For a fluctuating super-channel, the turn-up engine 555 will remain in this state until the fluctuation stops.

SUCCESS: if the input power is determined to be stable while in the STABILITY CHECK STATE, then the turn-up engine 555 transitions to the SUCCESS state. If a "NO ALARMS" condition occurs while in the SUCCESS state, the turn-up engine 555 transitions to the REGULAR CONTROL state. It is noted that alarms (e.g., corresponding to the thresholds described with respect to FIG. 4) are not detected (i.e., are ignored) by the turn-up engine 555 while in the LEVEL CHECK, INIT, STABILITY CHECK, and INSTABILITY CHECK states; and thus are of IGNORE value. This is because the WSS attenuation is high in these states, since the intermediate power targeting is still in progress. Thus, it may be possible that the OPM read powers are not reliable in these states due to such high attenuation levels. Accordingly, the ALARMS condition is ignored in these states. On the other hand, the SUCCESS state of the turn-up engine 555 indicates that super-channel power is reliable. It is noted that super-channel is a general term which includes single carrier or multi-carrier waves. Accordingly, in the SUCCESS state, the ALARMS condition can be evaluated based on the difference measured power and target power at the tributary input port.

FAIL: if, from the LEVEL CHECK state, the turn-up engine 555 determines that the upper and/or lower WSS attenuation limits are exhausted; i.e., that further adjustment in the WSS is not possible to meet the intermediate target power, the turn-up engine 555 transitions to the 'FAIL' state.

TURNUP FREEZE: The state machine transitions to this state if the shutter is put into a maintenance (MAINT) condition during IPT.

REGULAR FREEZE: The state machine transitions to this state from the REGULAR CONTROL state if the shutter is put into the MAINT condition after IPT is complete.

REGULAR CONTROL: The state machine transitions to this state from the SUCCESS state if a NO 'ALARMS' condition is fed to the turn-up engine 555.

FIG. 6 is a state transition diagram 600 illustrating example state transitions of the turn-up engine 555. It is noted that diagram 600 does not illustrate all of the transitions of the turn-up engine 555, and diagram 600 should be considered together with diagram 700 as shown and described with respect to FIG. 7. Most of the state transitions illustrated in diagram 600 are triggered by the 'SHUTTER' state and 'ALARMS' conditions, which are input to the turn-up engine 555 from the WSS controller, except for transitions from the 'UNKNOWN' state 610. After a system reboot (e.g., ROADM reboot), information 605, which in this example includes the persisted state variable P (1 or 0) and the WSS connection state (BLOCKED or UNBLOCKED), are input from the WSS controller to the turn-up engine 555, which is initialized to the default 'UNKNOWN' state 610.

From the 'UNKNOWN' state 610, on a condition 612 that the WSS connection state is BLOCKED, then the turn-up engine 555 transitions from 'UNKNOWN' state 610 to the 'INIT' state 620. On a condition 614 that the WSS connection state is UNBLOCKED and P is equal to 1, the turn-up engine 555 transitions from 'UNKNOWN' state 610 to the "LEVEL CHECK' state 630. On a condition 616 that the WSS connection state is UNBLOCKED and P is not equal to 1, the turn-up engine 555 transitions from 'UNKNOWN' state 610 to the 'REGULAR CONTROL' state 640.

From the 'INIT' state 620, the turn-up engine 555 transitions to the 'LEVEL CHECK' state 630 on a condition 622 that the 'SHUTTER' is or becomes OPEN. The turn-up engine 555 does not transition from the 'INIT' state 620 based on SHUTTER conditions on a condition 624 that the 'SHUTTER' is not in OPEN state.

From the "LEVEL CHECK' state 630, the turn-up engine 555 transitions to the 'INIT' state 620 on a condition 632 that the 'SHUTTER' is CLOSED. The turn-up engine 555 does not transition from the 'LEVEL CHECK' state 630 based on SHUTTER condition on a condition 634 that the 'SHUTTER' remains OPEN. The turn-up engine 555 transitions to the TURNUP FREEZE' state 650 on a condition 636 that the 'SHUTTER' enters the MAINT state.

From the 'REGULAR CONTROL' state 640, the turn-up engine 555 transitions to the 'INIT' state 620 on a condition 642 that the 'SHUTTER' is or becomes CLOSED. The turn-up engine 555 transitions to the 'REGULAR FREEZE' state 660 on a condition 644 that the 'SHUTTER' enters the MAINT state. The turn-up engine 555 remains in the 'REGULAR CONTROL' state 640 on a condition 641 that the 'SHUTTER' remains OPEN.

From the 'TURNUP FREEZE' state 650, the turn-up engine 555 transitions to the 'LEVEL CHECK' state 630 on a condition 652 that the 'SHUTTER' enters the OPEN state. The turn-up engine 555 transitions to the 'INIT' state 620 on a condition 654 that the 'SHUTTER' enters the CLOSED state. The turn-up engine 555 does not transition from the 'TURNUP FREEZE state 650 based on SHUTTER conditions on a condition 656 that the 'SHUTTER' remains in the MAINT state.

From the 'REGULAR FREEZE' state 660, the turn-up engine 555 transitions to the 'REGULAR CONTROL' state 640 on a condition 662 that the 'SHUTTER' enters the OPEN state. The turn-up engine 555 transitions to the 'INIT' state 620 on a condition 664 that the 'SHUTTER' enters the CLOSED state. The turn-up engine 555 does not transition from the 'REGULAR FREEZE state 660 based on SHUTTER conditions on a condition 666 that the 'SHUTTER' remains in the MAINT state.

From the 'STABILITY CHECK' state 670 the turn-up engine 555 transitions to the 'INIT' state 620 on a condition 672 that the 'SHUTTER' enters the CLOSED state. The turn-up engine 555 transitions to the 'TURNUP FREEZE' state 650 on a condition 674 that the 'SHUTTER' enters the MAINT state. The turn-up engine 555 does not transition from the 'STABILITY CHECK' state 670 based on SHUTTER conditions on a condition 676 that the 'SHUTTER' remains in the OPEN state.

From the 'INSTABILITY' state 680 the turn-up engine 555 transitions to the 'INIT' state 620 on a condition 682 that the 'SHUTTER' enters the CLOSED state. The turn-up engine 555 transitions to the 'TURNUP FREEZE' state 650 on a condition 684 that the 'SHUTTER' enters the MAINT state. The turn-up engine 555 does not transition from the 'INSTABILITY' state 680 based on SHUTTER conditions on a condition 686 that the 'SHUTTER' remains in the OPEN state.

From the 'FAIL' state 690 the turn-up engine 555 transitions to the 'INIT' state 620 on a condition 692 that the 'SHUTTER' enters the CLOSED state. The turn-up engine 555 transitions to the 'TURNUP FREEZE' state 650 on a condition 694 that the 'SHUTTER' enters the MAINT state. The turn-up engine 555 transitions to the 'LEVEL CHECK' state 630 on a condition 696 that the 'SHUTTER' remains in the OPEN state and the 'ALARMS' state is in the NO ALARMS condition. The turn-up engine 555 remains in the 'FAIL' state 690 on a condition 698 that the 'SHUTTER' remains in the OPEN state and the 'ALARMS' state is in the ALARMS condition.

From the 'SUCCESS' state 691 the turn-up engine 555 transitions to the 'INIT' state 620 on a condition 693 that the 'SHUTTER' enters the CLOSED state. The turn-up engine 555 transitions to the 'TURNUP FREEZE' state 650 on a condition 695 that the 'SHUTTER' enters the MAINT state. The turn-up engine 555 transitions to the 'REGULAR CONTROL' state 640 on a condition 687 that the 'SHUTTER' remains in the OPEN state and the 'ALARMS' state is in the NO ALARMS condition. The turn-up engine 555 remains in the 'SUCCESS' state 680 on a condition 699 that the 'SHUTTER' remains in the OPEN state and the 'ALARMS' state is in the ALARMS condition.

FIG. 7 is state transition diagram 700 illustrating example functionality of the turn-up engine 555. It is noted that diagram 700 does not illustrate all of the transitions of the turn-up engine 555, and diagram 700 should be considered together with diagram 600 as shown and described with respect to FIG. 6. State transitions in diagram 700 are triggered by measured power ('measured_power' parameter) and a difference between the measured power of the super-channel and the intermediate target power.

From the 'LEVEL CHECK' state 630, on a condition 705 that an absolute value of the difference between the expected_power parameter and the measured_power parameter exceeds a stability tolerance threshold S, the turn-up engine 555 transitions from 'LEVEL CHECK' state 630 to the 'INSTABILITY' state 680. In this example, S=0.5 is the stability tolerance threshold. If the difference between the expected and the measured power is more than S then the power is deemed fluctuating and hence unstable. If the difference is less than 0.5 then the power can be considered to be stable and not fluctuating. On a condition 710 that an absolute value of the difference between the measured_power parameter and the intermediate target power is less than or equal to a threshold C, the turn-up engine 555 transitions from 'LEVEL CHECK' state 630 to the 'STABILITY CHECK' state 670. On a condition 715 that an absolute value of the difference between the measured_power parameter and the intermediate target power is greater than a threshold C and that calculated_attn is greater than upper_attn_limit or that calculated_attn less than lower_attn_limit, the turn-up engine 555 transitions from 'LEVEL CHECK' state 630 to the 'FAIL' state 690.

On a condition 720 that an absolute value of the difference between the measured_power parameter and the intermediate target power is greater than threshold C, and that calculated_attn is less than or equal to upper_attn_limit, and that calculated_attn is greater than or equal to lower_attn_limit, the turn-up engine 555 remains in 'LEVEL CHECK' state 630.

From the 'STABILITY CHECK' state 670, on a condition 725 that an absolute value of the difference between the expected_power parameter and the measured_power parameter is greater than threshold S, the turn-up engine 555 transitions from 'STABILITY CHECK' state 670 to the 'INSTABILITY' state 680. On a condition 730 that an absolute value of the difference between the expected_power parameter and the measured_power parameter is less than or equal to threshold S, measured Ns times (as part of the WSS controller control loop cycle), the turn-up engine 555 transitions from 'STABILITY CHECK' state 670 to the 'SUCCESS' state 691. On a condition 735 that an absolute value of the difference between the expected_power parameter and the measured_power parameter is less than or equal to threshold S, measured fewer than Ns times (as part of the WSS controller control loop cycle), the turn-up engine 555 remains in the 'STABILITY CHECK' state 670.

From the 'INSTABILITY' state 680, on a condition 740 that an absolute value of the difference between the expected_power parameter and the measured_power parameter is less than or equal to threshold S, measured at least Ni times, the turn-up engine 555 transitions from the 'INSTABILITY' state 680 to the 'LEVEL CHECK' state 630. On a condition 745 that an absolute value of the difference between the expected_power parameter and the measured_power parameter is less than or equal to threshold S, measured less than Ni times, the turn-up engine 555 remains in the 'INSTABILITY' state 680.

From the 'SUCCESS state 691, on a condition 750 that an absolute value of the difference between the expected_power parameter and the measured_power parameter is greater than to threshold S, the turn-up engine 555 transitions from the 'SUCCESS' state 691 to the 'INSTABILITY' state 680. Otherwise, the turn-up engine 555 remains in the SUCCESS state 691.

From the 'FAIL' state 690, on a condition 760 that an absolute value of the difference between the measured_power parameter and the intermediate target power is greater than a threshold C, and that calculated_attn is less than or equal to upper_attn_limit, and that calculated_attn is greater than or equal to lower_attn_limit, the turn-up engine 555 transitions from the 'FAIL' state 690 to the 'LEVEL CHECK' state 630. On a condition 755 that an absolute value of the difference between the expected_power parameter and the measured_power parameter is greater than a threshold S, the turn-up engine 555 transitions from the 'FAIL' state 690 to the 'INSTABILITY' state 680. On a condition 761 that an absolute value of the difference between the measured_power parameter and the intermediate target power is greater than a threshold C, that it is not true that both calculated_attn is less than or equal to upper_attn_limit, and that calculated_attn is greater than or equal to lower_attn_limit, and that it is true that an absolute value of the difference between expected_power and measured_power is greater than or equal to S, the turn-up engine 555 remains in the 'FAIL' state 690.

It is noted that the system described in FIGS. 5, 6, and 7 is exemplary in nature, is not intended to limit the scope of the disclosure, and that different implementations are possible.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for adding or removing an optical signal to or from a fiber optic line, comprising
   blocking input to the fiber optic line of at least a portion of a spectrum of the fiber optic line using a wavelength selective switch (WSS), the portion of the spectrum corresponding to the optical signal;
   gradually unblocking the portion of the spectrum until a power of the optical signal measured after the WSS is equal to a predetermined level; and
   on a condition that at least one characteristic of the optical signal after the WSS satisfies a criterion, such that a variation in the power of the optical signal is below a variation threshold, further unblocking the portion of the spectrum until the power of the optical signal at the input to the fiber optic line is equal to an operational level.

2. The method of claim 1, wherein the criterion further comprises a permitted wave.

3. The method of claim 1, wherein the predetermined level comprises an intermediate power target (IPT).

4. The method of claim 1, wherein the predetermined level is low enough not to impact other optical signals on the fiber optic line.

5. The method of claim 1, wherein the predetermined level is high enough for the optical signal be reliably measured after the WSS.

6. The method of claim 1, wherein the predetermined level is based on a spectral width of the optical signal.

7. The method of claim 1, wherein the predetermined level is based on a minimum power requirement of a fiber optic amplifier.

8. An optical multiplexer operable to add an optical signal to a fiber optic line, comprising:
   a processor;
   a wavelength selective switch (WSS) operable to block input to the fiber optic line of a portion of a spectrum of the fiber optic line corresponding to the optical signal; the WSS further operable to gradually unblock the portion of the spectrum until a power of the optical signal measured after the WSS is equal to a predetermined level; and
   the WSS further operable to, on a condition that at least one characteristic of the optical signal measured after the WSS satisfies a criterion, such that a variation in the power of the optical signal is below a variation threshold, further unblock the portion of the spectrum until the power of the optical signal after the WSS is equal to an operational level.

9. The optical multiplexer of claim 8, wherein the criterion further comprises a permitted wave.

10. The optical multiplexer of claim 8, wherein the predetermined level comprises an intermediate power target (IPT).

11. The optical multiplexer of claim 8, wherein the predetermined level is low enough not to impact other optical signals on the fiber optic line.

12. The optical multiplexer of claim 8, wherein the predetermined level is high enough to be reliably measured after the WSS.

13. The optical multiplexer of claim 8, wherein the predetermined level is based on a spectral width of the optical signal.

14. The optical multiplexer of claim 8, wherein the predetermined level is based on a minimum power requirement of a fiber optic amplifier.

15. An optical add-drop multiplexer (OADM) operable to add or remove an optical signal to or from a fiber optic line, comprising:
   a processor;
   a wavelength selective switch (WSS) comprising a WSS input port, a first WSS output port in communication with an optical power monitoring device (OPM) and a second WSS output port in communication with an output port of the OADM;
   the WSS operable to communicate the optical signal from the WSS input port to the OPM via the first WSS output, and to selectively block communication of the optical signal from the WSS input port to the output port of the OADM via the second WSS output port;
   the OPM operable to evaluate the optical signal to determine whether it meets a criterion, such that a variation in the power of the optical signal is below a variation threshold; and the WSS operable to unblock and communicate the optical signal from the WSS input port to the output port of the OADM via the second WSS output port on a condition that the optical signal is determined to meet the criterion.

16. The OADM of claim 15, wherein communicating the optical signal from the WSS input port to the output port of the OADM via the second WSS output port comprises ramping up power of the optical signal.

17. The OADM of claim 15, wherein the optical signal is communicated from the output port of the OADM to the WSS input port in a demultiplexer direction of the OADM.

* * * * *